United States Patent
Lotz

(10) Patent No.: US 11,520,614 B2
(45) Date of Patent: Dec. 6, 2022

(54) OPERATING SYSTEM-AGNOSTIC CONTAINER RUNTIME

(71) Applicant: DISH Network L.L.C., Englewood, CO (US)

(72) Inventor: Allyson Lotz, Denver, CO (US)

(73) Assignee: DISH Network L.L.C., Englewood, CO (US)

(*) Notice: Subject to any disclaimer, the term of this patent is extended or adjusted under 35 U.S.C. 154(b) by 302 days.

(21) Appl. No.: 16/814,039

(22) Filed: Mar. 10, 2020

(65) Prior Publication Data
US 2021/0286637 A1   Sep. 16, 2021

(51) Int. Cl.
G06F 9/455        (2018.01)
G06N 20/00        (2019.01)

(52) U.S. Cl.
CPC ......... G06F 9/45558 (2013.01); G06N 20/00 (2019.01); G06F 2009/45562 (2013.01)

(58) Field of Classification Search
CPC .............................. G06F 9/45558; G06N 20/00
USPC .......................................................... 713/1
See application file for complete search history.

(56) References Cited

U.S. PATENT DOCUMENTS

| | | | | |
|---|---|---|---|---|
| 6,097,933 A * | 8/2000 | Bennett | ............. | H04W 52/0216 340/7.42 |
| 6,104,868 A * | 8/2000 | Peters | ................... | H04L 41/022 709/216 |
| 9,503,058 B1 * | 11/2016 | Cical | ........................ | G06F 1/324 |
| 9,817,614 B2 * | 11/2017 | Suzuki | ................... | G06F 3/1247 |
| 10,671,443 B1 * | 6/2020 | Ramachandran | ..... | G06F 16/903 |
| 10,877,739 B1 * | 12/2020 | Fernandez | ............. | G06F 9/455 |
| 2001/0027464 A1 * | 10/2001 | Tavoletti | ............... | G06F 9/4843 719/310 |
| 2006/0026280 A1 * | 2/2006 | Sadovsky | ............... | H04L 69/18 709/224 |
| 2009/0089453 A1 * | 4/2009 | Bohan | ..................... | G06F 9/452 709/246 |
| 2011/0231862 A1 * | 9/2011 | Walsh | ..................... | G06F 13/00 719/318 |
| 2013/0227177 A1 * | 8/2013 | Cho | ..................... | G06F 11/3051 710/16 |
| 2014/0075177 A1 * | 3/2014 | Sugitachi | .............. | G06F 1/3228 713/2 |

(Continued)

*Primary Examiner* — Paul R. Myers
(74) *Attorney, Agent, or Firm* — Kilpatrick Townsend & Stockton LLP

(57) ABSTRACT

Novel techniques are described for operating system (OS) agnostic containerization for application deployment. For example, an application is being deployed to a large number of target computational environments running a variety of different OSs, including OSs that are either unknown to the deployment environment or not directly supported by OS-specific container runtimes accessible to the deployment environment. Embodiments can automatically generate a resource profile of a target OS running in a target computational environment, for example, by exploiting functionality of a network interface application also running in the target computational environment. The resource profile can be used to convert an OS-agnostic container runtime into a target-tailored container runtime (tailored for the target OS), and the target-tailored runtime can be deployed to build the containerized application in the target computational environment.

19 Claims, 4 Drawing Sheets

(56) References Cited

U.S. PATENT DOCUMENTS

| | | | |
|---|---|---|---|
| 2014/0344480 A1* | 11/2014 | Borve | G06F 13/102 |
| | | | 710/8 |
| 2016/0004292 A1* | 1/2016 | Sharda | G06F 13/4022 |
| | | | 710/317 |
| 2016/0360594 A1* | 12/2016 | Chemel | H05B 47/19 |
| 2017/0342948 A1* | 11/2017 | Tonkin | F02M 31/13 |
| 2018/0285165 A1* | 10/2018 | Helsley | G06F 9/5077 |
| 2018/0345888 A1* | 12/2018 | Lounnas | B60R 16/033 |
| 2020/0084132 A1* | 3/2020 | Chauhan | H04L 63/20 |
| 2021/0058295 A1* | 2/2021 | Pianigiani | G06F 9/4416 |

* cited by examiner

OPERATING SYSTEM-AGNOSTIC CONTAINER RUNTIME

FIELD

This invention relates generally to runtime engines for application deployment, and, more particularly, to operating system-agnostic runtime engines to support containerization of applications for deployment across devices.

BACKGROUND

In many computing environments, it is desirable to easily be able to develop and deploy new software applications in a reliable manner across different computational platforms. However, different platforms tend to have different types of available resources and/or to access those resources in different ways. For example, different operating systems (OSs) may have access to and/or different names for different types of memory, libraries, functions, etc. For these and other reasons, cross-platform deployments of applications often manifest errors and bugs when deployed and executed on computational environments, particularly where the deployment environment is appreciably different from the development environment (the computational platform on which the application was developed).

One way to achieve effective cross-platform deployment is to develop and support multiple specific versions of the application for each of multiple types of deployment environments. Such an approach can have many limitations, such as being more expensive, more time-consuming, providing more opportunity for error, etc. Other approaches involve building self-enclosed software application environments, such as virtual machines and containers, which can effectively control the environment into which an application is being deployed. Conventionally, such approaches are also limited in a number of ways. For example, virtual machines tend to consume appreciable resources, and the virtual machines themselves tend to be error prone when deployed on highly disparate platforms. Containers are typically less resource intensive and error-prone than virtual machines in many cases, but running the container typically relies on presence of a container runtime engine. To date, a limitation of containers is that such container runtime engines tend only to be available for particular set of operating system environments. As such, containerization can be ineffective or impractical in scenarios where a particular application may be deployed to large numbers of disparate platforms, and/or where the platforms are not of a known or predictable type.

BRIEF SUMMARY

Among other things, embodiments provide novel systems and methods for operating system (OS) agnostic containerization for application deployment. For example, an application is being deployed to a large number of target computational environments running a variety of different OSs, including OSs that are either unknown to the deployment environment or not directly supported by OS-specific container runtimes accessible to the deployment environment. Embodiments can automatically generate a resource profile of a target OS running in a target computational environment, for example, by exploiting functionality of a network interface application also running in the target computational environment. The resource profile can be used to convert an OS-agnostic container runtime into a target-tailored container runtime (tailored for the target OS), and the target-tailored runtime can be deployed to build the containerized application in the target computational environment.

According to one set of embodiments, a method is provided for OS-agnostic containerization. The method includes: communicating a constructor script from a containerization environment to a network interface application, the constructor script requesting a set of OS descriptors of a target OS that is running the network interface application in a target computational environment, the OS descriptors characterizing OS-to-resource interactivity; receiving, by the containerization environment from the network interface application, a constructor response indicating at least a portion of the set of OS descriptors generated by the network interface application responsive to the constructor script; generating a resource profile for the target OS by the containerization environment in accordance with the constructor response; converting, by the containerization environment, an OS-agnostic (OSA) container runtime to a target-tailored container runtime by disambiguating OSA resource interfaces as target-tailored resource interfaces in accordance with the resource profile; and deploying, by the containerization environment to the target computational environment, a container package having the target-tailored container runtime and a container image of an application built according to the OSA container runtime.

According to another set of embodiments, a system is provided for OS-agnostic containerization. The system includes one or more processors and a processor-readable memory. The memory has instructions stored thereon, which, when executed, cause the one or more processors to perform steps comprising: communicating a constructor script to a network interface application, the constructor script requesting a set of OS descriptors of a target OS that is running the network interface application in a target computational environment, the OS descriptors characterizing OS-to-resource interactivity; receiving, from the network interface application, a constructor response indicating at least a portion of the set of OS descriptors generated by the network interface application responsive to the constructor script; generating a resource profile for the target OS by the containerization environment in accordance with the constructor response; converting, by the containerization environment, an OS-agnostic (OSA) container runtime to a target-tailored container runtime by disambiguating OSA resource interfaces as target-tailored resource interfaces in accordance with the resource profile; and deploying, by the containerization environment to the target computational environment, a container package having the target-tailored container runtime and a container image of an application built according to the OSA container runtime.

According to another set of embodiments, another system is provided for OS-agnostic containerization. The system includes a resource profiler and a runtime generator. The resource profiler is implemented by a containerization environment of a server computer system, and is configured to generate a resource profile of a target OS of a target computational environment in communication with the containerization environment via a communication network by: communicating a constructor script to a network interface application, the constructor script requesting a set of OS descriptors of a target OS that is running the network interface application in a target computational environment, the OS descriptors characterizing OS-to-resource interactivity; receiving, from the network interface application, a constructor response indicating at least a portion of the set of OS descriptors generated by the network interface application responsive to the constructor script; and generating a resource profile for the target OS by the containerization environment in accordance with the constructor response. The runtime generator is implemented by the containerization environment, is coupled with the resource profiler, and is configured to convert an OS-agnostic (OSA) container runtime to a target-tailored container runtime for deployment to the target computational environment to be run on the target OS by disambiguating OSA resource interfaces as target-tailored resource interfaces in accordance with the resource profile.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
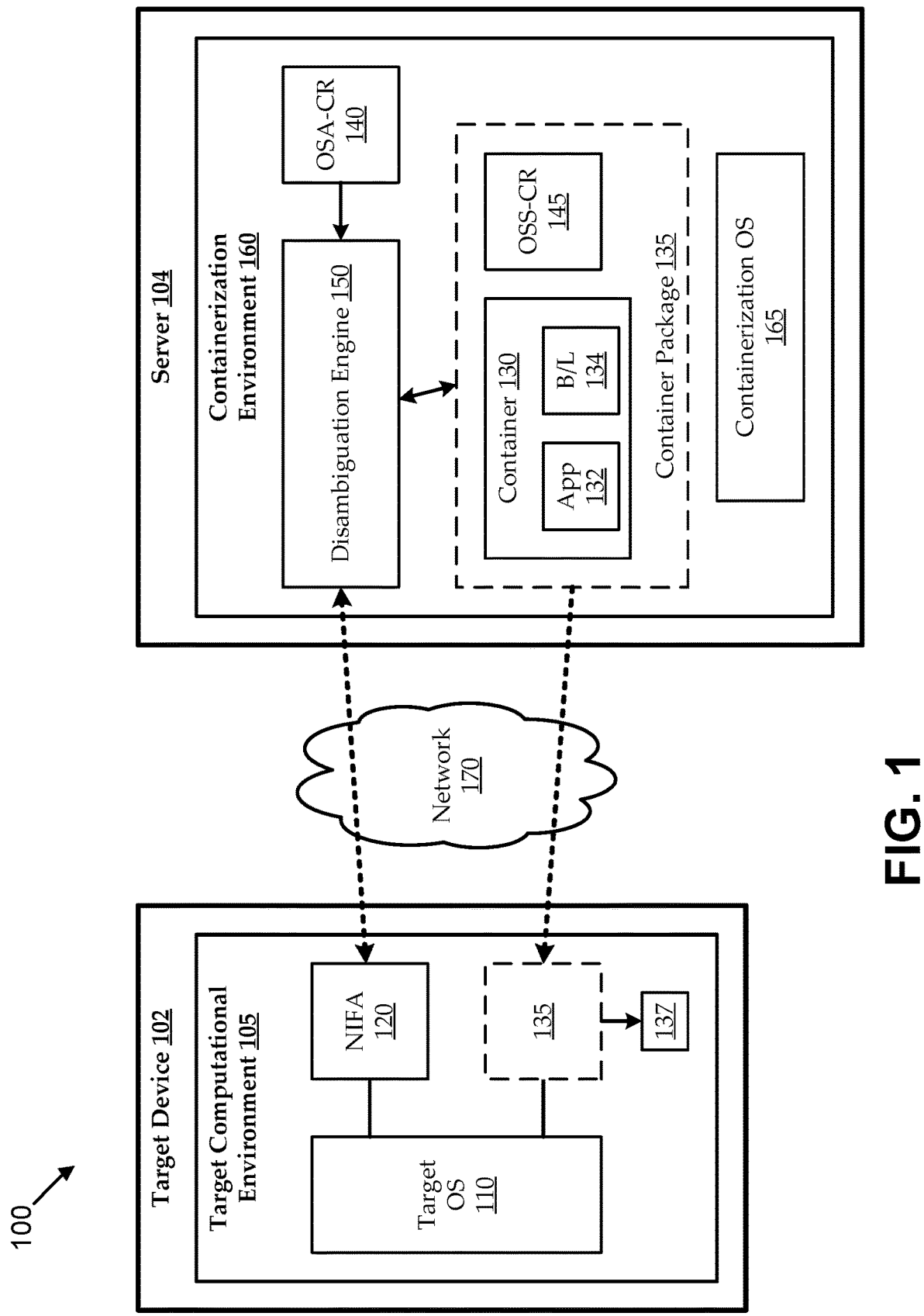
FIG. 1 shows a network environment as a context for various embodiments.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

In many computing environments, it is desirable to easily be able to develop and deploy new software applications in a reliable manner across different computational platforms. Traditionally, application code developed in one computing environment often manifests errors and bugs when deployed and executed on other computational environments. Some causes of this include that different computational environments, such as computers running different operating systems and/or different versions of operating systems (OSs), can differ in what computational resources are available to applications, how those resources are called by and/or made available to applications, etc. For example, a developer of a certain application may desire to deploy a same application on different personal computer operating systems (e.g., Windows OS, Apple OS, Linux, etc.), on special use operating systems (e.g., a proprietary operating system developed for an automobile, a smart appliance, etc.), and/or on any other computational environment. Traditionally, such wide deployments involved application developers writing, testing, deploying, and supporting different versions of the application code for each computational environment. However, such approaches have tended to be impractical and tend to increase opportunities for errors. Continuing increases in the numbers and types of potential computational environments for application deployments have further decreased the viability of such traditional approaches for many scenarios.

Over at least the past decade, other approaches have been developed that effectively build self-enclosed software application environments, thereby providing reliable and efficient cross-platform application deployment. One type of such an environment is known as virtual machines, which generally run in a target hardware environment having, deployed thereon, a host operating system, and a so-called hypervisor that permits execution of the virtual machine. Each instance of the application is a virtual machine that has its own instance of the application code, along with its own instance of supporting code, including a guest operating system and various binaries, libraries, etc. Each instance of the supporting code provides the resources needed by each instance of the application code for execution. However, those repeated instances of supporting code also consume appreciable resources, and deployment of the virtual machines still can sometimes be unreliable, for example, when the development and deployment platforms are significantly different.

Another approach to self-enclosed software application environment is known as containerization. Containerization deploys applications in so-called containers, which generally run in a target hardware environment having, deployed thereon, a host operating system (like virtual machines), and a so-called runtime engine (unlike virtual machines) that facilitates execution of the containers. Creating a container typically involves generating a manifest to describe the container and building out an image of the application code; then pushing the manifest and image information to a registry to generate the container. Like the virtual machines, each container instance has all the various libraries, binaries, etc. needed for running the application. However, unlike the virtual machines, the container runtime engine allows the container to run on the host operating system without also relying on an instance of a guest operating system. For example, if an application is developed and containerized using a particular container platform, it can reliably be deployed and run on any other computational environment that also has and can run the particular container platform. Thus, reliance on the container runtime engine can provide various features, such as allowing each container instance to be lighter-weight, more scalable, more modular, more efficient, and more reliable than virtual machines in many cases.

Notably, running a containerized application in a computational environment can depend on also being able to run the container runtime engine in the target computational environment. Conventional container platforms (e.g., runtime engines) are designed to run in a single computational environment (e.g., Linux). In limited cases, a same conventional container platform can have multiple specific versions designed to run in different respective computational environments (e.g., one for Linux, one for Windows, one for Apple, etc.). Thus, conventional containerized deployments tend to be built with knowledge of the target computational environment by using a container platform compatible with the target computational environment. While such an approach works well when the target computational environment is known, such conventional approaches may be ineffective (or unpredictable) in contexts where the target environment is unknown.

For the sake of illustration, suppose an application is developed on a computer running a first proprietary OS ("AOS"), and will be deployed on computers running a second proprietary OS ("BOS"). A typical conventional containerization platform may support separate versions of its container runtime both for AOS and BOS, and it may generate container images in accordance with AOS, BOS, some lightweight version of AOS or BOS, or even some other proprietary or non-proprietary OS. As described above, a container is typically an instance of a container image generated to have the application code, along with any binaries, libraries, and/or other supporting code needed to run the application code. Suppose in this example that the containerization platform generates images for a lightweight version of some open-source OS ("COS"). During containerization, a container image is generated to have the application code for execution in COS, along with any COS binaries, libraries, and/or other supporting code needed to run the application code in COS. Deploying to a target environment running BOS can involve deploying an instance of the container image along with an instance of the OS-specific container runtime designed for BOS. When received in the target environment, the OS-specific runtime is executed in BOS and builds a self-enclosed application space that effectively looks like COS (e.g., the container runtime provides a sort-of translation layer between COS and BOS), and the OS-specific runtime is then able to handle installation and execution of the application code in COS in a manner that supports future execution within the target BOS platform. It can be seen that the effectiveness of this approach depends on prior knowledge that the target deployment environment is running BOS, and that there is a version of the container runtime built to run in BOS.

Embodiments described herein include novel techniques for OS-agnostic containerization of applications. Rather than depending on prior knowledge of the deployment environment and/or on having OS-specific container runtimes, embodiments described herein seek to dynamically characterize the target environment and to generate and use a container runtime tailored to the characterized environment. For example, embodiments can automatically develop a relevant resource profile to characterize the target deployment environment, convert an OS-agnostic container runtime to a target-tailored container runtime in accordance with the resource profile, and containerize and deploy the application based on the target-tailored container runtime.

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Turning to FIG. 1, a network environment 100 is shown as a context for various embodiments. The network environment 100 includes a server 104 in communication with a target device 102 via a communication network 170. While the server 104 is shown as a single component, the server 104 can be implemented in any suitable manner, such as using one or more distributed computational devices. In one implementation, the server 104 is implemented as a cloud computing server. Similarly, while only a single target device is shown 102 communicating over a single network 170, embodiments can operate in context of large numbers of target devices 102 communicating over one or more communication networks 170. The one or more communication networks 170 can include any type of wired or wireless network, or combination thereof. Merely by way of example, the communication network(s) 170 can include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the communication network(s) 170 include one or more network access points, such as wired or wireless network access points (e.g., base stations and/or internet exchange points).

As illustrated, the server has a containerization environment 160 implemented (e.g., running) thereon, and the target device 102 has a target computational environment 105 implemented (e.g., running) thereon. The containerization environment 160 is running on a containerization operating system (OS) 165, the target computational environment 105 is running on a target OS 110, and the containerization OS 165 and the target OS 110 may be the same or different OSs. As described above, embodiments seek to facilitate development and deployment of one or more applications from the containerization environment 160 to the target computational environment 105 (e.g., or multiple target computational environments 105 of multiple target devices 102) in a manner that is agnostic to the type of target OS 110. Some embodiments can operate even with no prior knowledge of the type and/or characteristics of the target OS 110, other than that the target OS 110 facilitates communications between the target computational environment 105 and the server 104 via the communication network 170.

As illustrated, embodiments of the containerization environment 160 also include an OS-agnostic (OSA) container runtime 140 and a disambiguation engine 150. Generally, a container runtime can provide various types of features, such as defining a container image format; facilitating building, managing, and sharing container images according to that format; and handling (e.g., managing, running, etc.) instances of containers built from those images. The OSA container runtime 140 can include any such functionality and may or may not be generalized to facilitate the types of disambiguation described herein. Generally, the OSA container runtime 140 operates according to OSA resource interfaces characterized by OS-to-resource interactions. The OSA container runtime 140 can be built to operate in a particular OS, such as in the containerization OS 165. As used herein, "agnostic" is intended generally to indicate that the OSA container runtime 140 is not built specifically for a particular target OS 110. Of course, a situation can arise in which the target OS 110 happens to be the same as the containerization OS 165, such that the OSA container runtime 140 happens to be built for the target OS 110 without modification; other situations can arise in which the OSA container runtime 140 is more or less suited for adaptation into a container runtime for use by the target OS 110; and even other situations can arise in which tailoring of a container runtime for a particular target OS 110 is ineffective. Still, the OSA container runtime 140 is considered "OS-agnostic" with respect to whatever type of OS is found to be the target OS 110.

Embodiments of the disambiguation engine 150 seek to profile resource characteristics of the target computational environment 105 (e.g., of the target OS 110) and to disambiguate the OSA resource interfaces as target-tailored resource interfaces in accordance with the resource profile. A target-tailored container runtime can then be generated from the target-tailored resource interfaces and used for the application deployment into the target computational environment 105. Because the deployment is from a server 104 to a target device 102 over a communication network 170, it is known that the target OS 110 at least supports such network communications. As such, even absent specific information about the target OS 110, such support by the target OS 110 for network communications can yield an assumption that the target OS 110 runs some sort of network interface application (NIFA) 120. The NIFA 120 can be any suitable application for supporting such communications, such as a web browser, application installer, etc. In some implementations, deployment of the application is pushed by the server 104. For example, the application developer is using the server 104 to push out new applications, updates, bug fixes, and/or other application code to the one or more target devices 102. In other implementations, deployment of the application is pulled by the target device 102 (or the target computational environment 105). For example, the target computational environment 105 is configured to automatically look for new software or updates available at the server 104, a user opts to access the server 104 for download of an application or update, etc. In any of these or other implementations, one or more NIFAs 120 is typically involved. For example, in a pull implementation, a user may access a download page via a suitable NIFA 120, such as a web browser, or an installer application.

Application deployment can begin with an interaction (e.g., push or pull) between the NIFA 120 of the target computational environment 105 and the server 104. In response, the containerization environment 160 can effectively work with the NIFA 120 to develop a profile of the target computational environment 105, or more particularly, of the target OS 110. For example, a typical computational device running an OS is likely to implement some sort of computational processes, resources to be utilized by those processes, a network stack for connecting to one or more networks (e.g., the Internet), a mounting system for file systems, functions to manage those other functions, etc. Some such environments also support users and user groups, namespaces, and/or other features. As will be described more fully herein, such profile development can involve interactions between the server 104 (and containerization environment 160) and the NIFA 120, such as including communicating a construction script to the NIFA 120 that causes the NIFA 120 obtain certain information, and receiving one or more responses to the script that are useful for developing the profile.

To function as an NIFA 120, it can be assumed that certain minimal functionality is supported. One assumable function is that the NIFA 120 supports network communications. As such, it may be further assumed that the NIFA 120 is capable of accessing communication-related resources of the target computational environment 105, including communication-related functionality (e.g., function calls, processes, etc.) of the target OS 110. Another assumable function is that the NIFA 120 is an application that was installed on, and is able to run on, the target OS 110. As such, it may be further assumed that the NIFA 120 has relevant information and/or functions for interacting with some sort of memory (e.g., is installed in a particular file structure, or the like), and for executing code on the target OS 110 (e.g., by using process identifiers, namespaces, etc.), and/or for other related functions.

Embodiments use various techniques to exploit such assumable functions to generate a resource profile for the target OS 110. Various types of NIFAs 120, including web browsers, typically include internal task managers (or the like) that are aware of, among other things, their own process ID(s), CPU and GPU usage, several different memory footprints, several different caches, and networking and port information. This and other information known to the internal task managers of the NIFAs 120 can be used to build a set of information with which to characterize one or more of the network stack, process identification numbers, inter-process communication resources, mounting systems, memory, disk, central processing unit (though hardware is not part of the host OS, it is accessible via the host OS), user identification numbers, user groups, user group identification numbers, hostnames, domain names, namespaces, control groups, union file systems, etc. These types of resources can be relevant for building containers.

Ultimately, resource profile information is gathered by the disambiguation engine 150 through interactions with the NIFA 120. In accordance with the resource profile information, the OSA container runtime 140 can be converted into a target-tailored container runtime 145, which can be used to generate a container image 130 having application code 132 and supporting code 134 (e.g., binaries, libraries, etc.). The target-tailored container runtime 145 and container image 130 can be assembled into a container package 135, and the container package 135 can be deployed to the target computational environment 105. In the target computational environment 105, the target-tailored container runtime 145 can run on the target OS 110, thereby generating an instance of the application 137 (e.g., as a container) be installed and run in the target computational environment 105 on the target OS 110.

In general, FIG. 1 illustrates a set of embodiments for which the server 104 maintains control over the containerization environment 160. For example, a cloud-based containerization environment 160 communicates with the target computational environment 105 via the communication network(s) 170 to profile resource interactions of the target OS 110; the cloud-based containerization environment 160 generates the container package 135 remote from the target computational environment 105; and the cloud-based containerization environment 160 communicates the container package 135 to the target computational environment 105 over the communication network(s) 170 for execution. Other embodiments can be implemented in other ways.

Figure 2A:
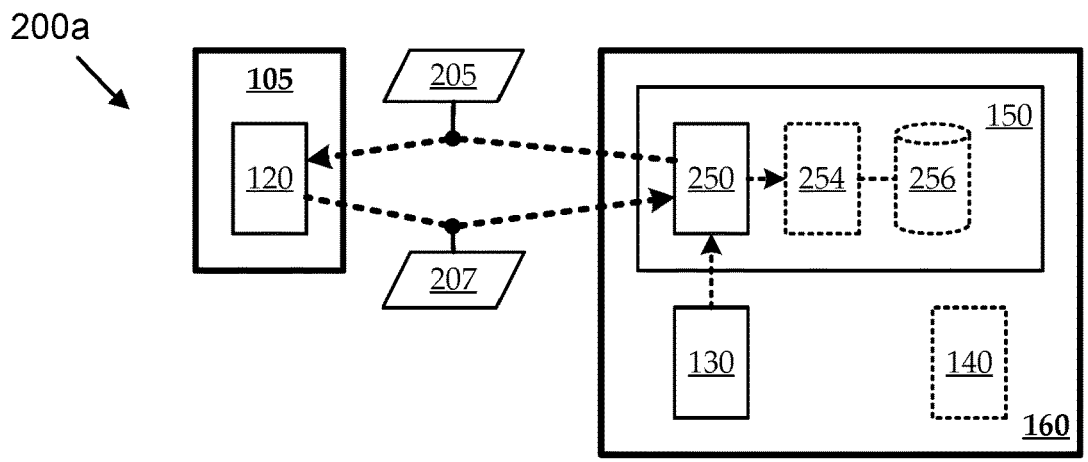
FIGS. 2A-2C show a simplified communication environment, operating in accordance with illustrative OS-agnostic containerization, according to various embodiments.
Figure 2B:
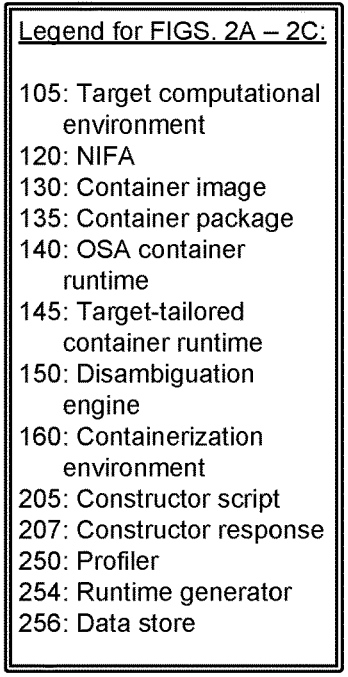
Figure 2B:
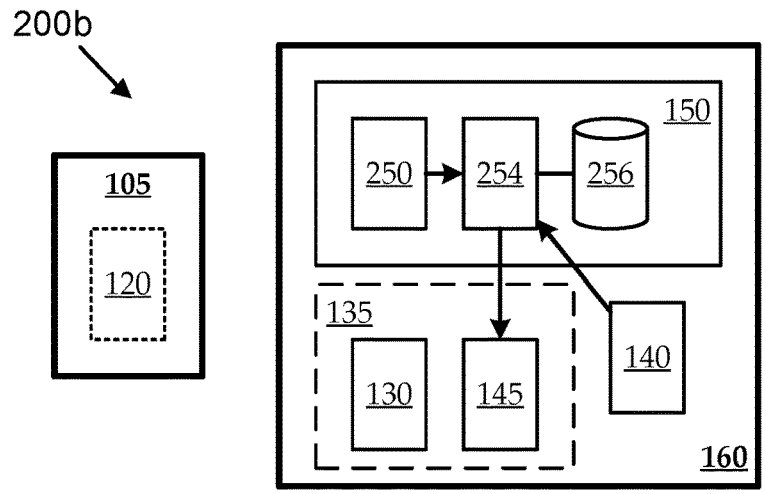
Figure 2C:
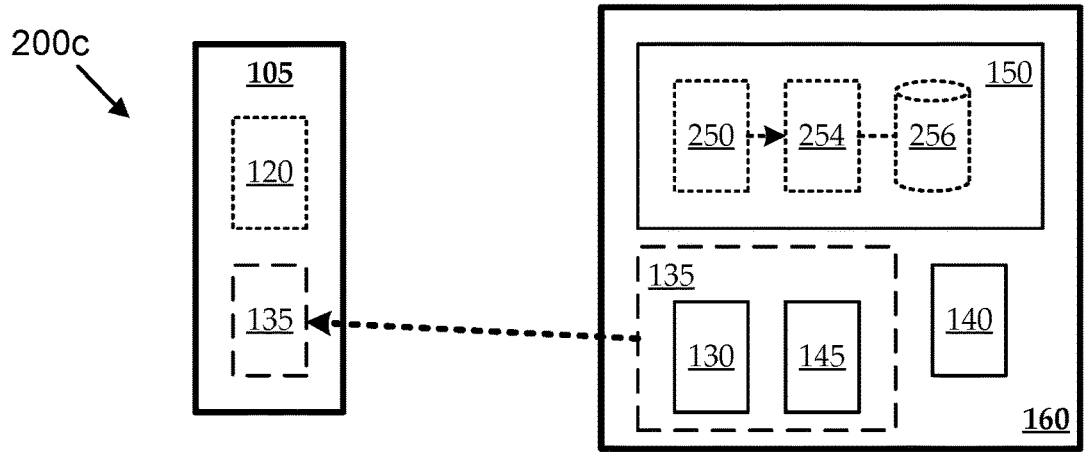

For added clarity, FIGS. 2A-2C show a simplified communication environment 200, operating in accordance with illustrative OS-agnostic containerization, according to various embodiments. Turning first to FIG. 2A, a first portion of OS-agnostic containerization is illustrated, in which a containerization environment 160 is in communication with a target computational environment 105 to generate a resource profile of the target computational environment 105 (e.g., of a target OS 110, not shown). In some implementations, the containerization environment 160 is implemented in a server, and the target computational environment 105 is implemented in a target device 102, such as in FIG. 1, and the containerization environment 160 and target computational environment 105 are in communication via one or more communication networks 170. As described herein, embodiments can commence with containerized application deployment responsive to a push request (e.g., from a server or other provider side component) and/or to a pull request (e.g., from a target device or other user side component). In some implementations, the push and/or pull request is automated (e.g., generated automatically by a computational platform in accordance with a schedule, detection of a trigger event, etc.). In other implementations, the push and/or pull request is manual (e.g., generated by a human user via a user interface).

As illustrated, the containerization environment 160 includes a disambiguation engine 150 that has a resource profiler 250, a runtime generator 254, and a data store 256. When the deployment commences (e.g., responsive to one or more push and/or pull requests), the resource profiler 250 communicates a constructor script 205 to a NIFA 120 (e.g., a web browser) of the target computational environment 105 (e.g., over a communication network 170). As described herein, the constructor script 205 requests a set of OS descriptors of a target OS 110 that is running the NIFA 120 in the target computational environment 105. The OS descriptors characterize OS-to-resource interactivity, such as what resources are available to the target OS 110, how the target OS 110 calls those resources, etc. In association with the NIFA 120 receiving the constructor script 205, the NIFA 120 is directed to generate a constructor response 207 that indicates at least a portion of the set of OS descriptors requested by the constructor script 205.

In some embodiments, receipt of the constructor script 205 by the NIFA 120 causes a prompt to be generated by a user interface of the NIFA 120. For example, the NIFA 120 is a web browser, and receipt of the constructor script 205 causes the web browser to display a webpage or popup asking the user to confirm download of the application being deployed, or any other suitable prompt. Interaction by the user with the prompt can trigger the constructor script 205 to seek OS descriptors in any suitable manner. In some implementations, the prompt itself assists the constructor script 205 with seeking OS descriptors. For example, while causing the user to perform a predictable interaction that has a predictable result (i.e., causing the user to interact with a prompt that is a graphical element of the NIFA 120), the constructor script 205 can be built to monitor the manner in which resources (e.g., display, user interface, process, memory, communication, etc.) are used to implement the interaction by the target computational environment 105. This can provide a well-bounded start to detecting the manner of OS-to-resource interaction by the target OS 110 of the target computational environment 105. Other embodiments can seek OS descriptors without relying on a user prompt.

In some embodiments, the same constructor script 205 for any application being deployed. For example, a standard set of OS descriptors can be determined as what is needed to generate a target-tailored container runtime, as described herein. In some such embodiments, the standard set can be a minimum set determined to be needed for generating a target-tailored container runtime; the minimum set accounting for those resources most likely to be available in some form for all (or nearly all) target OSs 110. In other such embodiments, the standard set can be a maximum set determined to be potentially useful for generating a target-tailored container runtime. When using such a maximum set, it may be assumed that some of the OS descriptors being sought will not be found, and the resulting set of OS descriptors will represent only a subset of the possible resources of the maximum set. In other embodiments, the set of OS descriptors can differ based on characteristics of the application itself. For example, containerization of some applications may rely on (or be more effective with) access to particular types of resources, other than the minimum resources needed to run a default container runtime. In some such cases, the constructor script 205 can be generated to request OS descriptors relating to minimum needs of a container runtime, as well as additional resource preferences of the application.

In some embodiments, the constructor script 205 seeks OS descriptors by issuing data requests to built-in application programming interfaces (APIs) of the NIFA 120. Such requests can infer the existence and implementation of various resources deemed important for container runtime operation. For example, to determine if a target OS 110 has processes, the data request can inquire how many processes the NIFA 120 has running, and/or can request the process identifier (PID) for the process running the NIFA 120. As another example, a data request can inquire how much central processing unit (CPU) power is currently being used by the NIFA 120 to determine if a CPU exists. As another example, the data request can inquire about the download path of the NIFA 120 to determine whether there are file and mounting systems and/or how any file systems are organized.

Responsive to the constructor script 205, the NIFA 120 generates the constructor response 207, identifying at least a portion of the OS descriptors. The constructor response 207 is communicated back to the resource profiler 250 (e.g., via a communication network 170). Responsive to receipt of the constructor response 207, the resource profiler 250 generates a resource profile for the target OS 110 based on the OS descriptors indicated by the constructor response 207. In some implementations, generating the resource profile involves parsing the constructor response 207 to obtain the OS descriptors as a set of OS-to-resource interactions of the target OS 110.

FIG. 2B shows a second portion of OS-agnostic containerization, in which the resource profile generated in FIG. 2A is used to generate a target-tailored container runtime 145. Embodiments of the resource profiler 250 communicate the generated resource profile of the target OS 110 to the runtime generator 254. Embodiments of the runtime generator 254 can then generate the target-tailored container runtime 145 from the resource profile in accordance with various types of information accessible to the runtime generator 254. In some embodiments, the runtime generator 254 has access to (e.g., via the data store 256, or in any suitable manner) an OSA container runtime 140. The OSA container runtime 140 can be defined in accordance with OSA resource interfaces. Each of the OSA resource interfaces relates to a particular one or more resources that may be accessible to an OS, and/or to a particular interaction between an OS and a particular one or more resources accessible thereto. The runtime generator 254 can use the OSA container runtime 140 effectively as a template for generation of the target-tailored container runtime 145. In some implementations, the OSA container runtime 140 is a fully functional container runtime, such as a container runtime designed to run on a particular OS. In such implementations, the functional container runtime can be used effectively as a default template that is converted and/or replaced, where desired, to fit the resource profile generated for the target OS 110. In other implementations, the OSA container runtime 140 provides OSA resource interfaces as instructions, templates, and/or other information as to what types of resource interfaces need to be created for effective generation of a functioning container runtime. Some such implementations can include default resource interface code and/or definitions, where desirable.

With the OSA container runtime 140 as a guide, embodiments of the runtime generator 254 generate the target-tailored container runtime 145 by disambiguating the OSA resource interfaces as target-tailored resource interfaces in accordance with the resource profile generated for the target OS 110. In some embodiments, the disambiguation involves mapping OS descriptors (e.g., as parsed from the constructor response 207) onto template resource interface definitions provided by the OSA container runtime 140 as its OSA resource definitions. In other embodiments, the data store 256 has, stored thereon, multiple OS profiles for different types of OSs, each having options for certain resource definitions as implemented for that type of OS. Some such embodiments can also store (e.g., in the data store 256) profiles previously generated for OSA resource definitions previously obtained from target environments. For example, after generating a profile for what appears to be a new (previously unknown to the system) target OS 110, a profile of that target OS 110 can be stored for future retrieval as a preset type of OS. In such embodiments, the runtime generator 254 can seek to match the resource profile of the target OS 110 to one or more of the OS profiles, and to use the matching OS profile(s) for disambiguating the OSA resource interfaces as the target-tailored resource interfaces. For example, the runtime generator 254 can determine that the target OS 110 handles a certain set of resource interactions in a manner that looks similar to how those resource interactions are handled by a particular commercially available OS ("OSZ"); accordingly, the runtime generator 254 identifies in the data store 256 a stored set of resource interfaces for OSZ to use in the disambiguation (e.g., the runtime generator 254 uses the OSZ resource interfaces as the target-tailored resource interfaces at least for those particular resources).

In some embodiments, the runtime generator 254 includes a machine learning engine, such as a deep reinforcement learning engine to perform the disambiguation. The machine learning engine can use, as training data, a variety of resource interactions known to be effective for different types of OSs, and/or any other suitable information. The resource profile generated by the resource profiler 250 is received as an input to the machine learning engine, and the machine learning engine seeks to find suitable disambiguations to effectively convert OSA resource interfaces into target-tailored resource interfaces for the target OS 110. In some implementations, the output of the machine learning engine includes mappings to model resource interfaces stored in the data store 256 (e.g., model resource interfaces associated with stored OS profiles, as described above). In other implementations, the output of the machine learning engine includes (or is used to develop) one or more custom resource interfaces as a function of the resource profile for use as corresponding ones of the target-tailored resource interfaces.

Having generated the target-tailored container runtime 145, the runtime generator 254 can effectively produce a container package 135. The container package 135 can include a container image 130 and the generated target-tailored container runtime 145. The container image 130 can include application code and supporting code (e.g., binaries, libraries, etc.). As illustrated in FIG. 3C, the containerization environment 160 can deploy the container package 135 to the target computational environment 105 (e.g., via a communication network 170). Because the target-tailored container runtime 145 is tailored to run on the target OS 110, the target computational environment 105 can run the target-tailored container runtime 145 upon receipt. Running the target-tailored container runtime 145 ultimately builds a container instance from the container image 130, using the various target-tailored resource interfaces (e.g., namespaces, control groups, union file systems, mounting systems, etc.). Such container building can involve installing software packages, exposing ports, allocating processes, and/or any other suitable actions, all capable of completion using the target-tailored resource interfaces (e.g., using structures developed by the target-tailored container runtime 145 prior to building the container). Once the container is built, the application can effectively run within the target OS 110 (i.e., the application is actually running in the container, which is running in the target OS 110; but the application acts as if it is running in the target OS 110). For example, a user can interact with the application without any indication that it is not running directly on the target OS 110.

Figure 3:
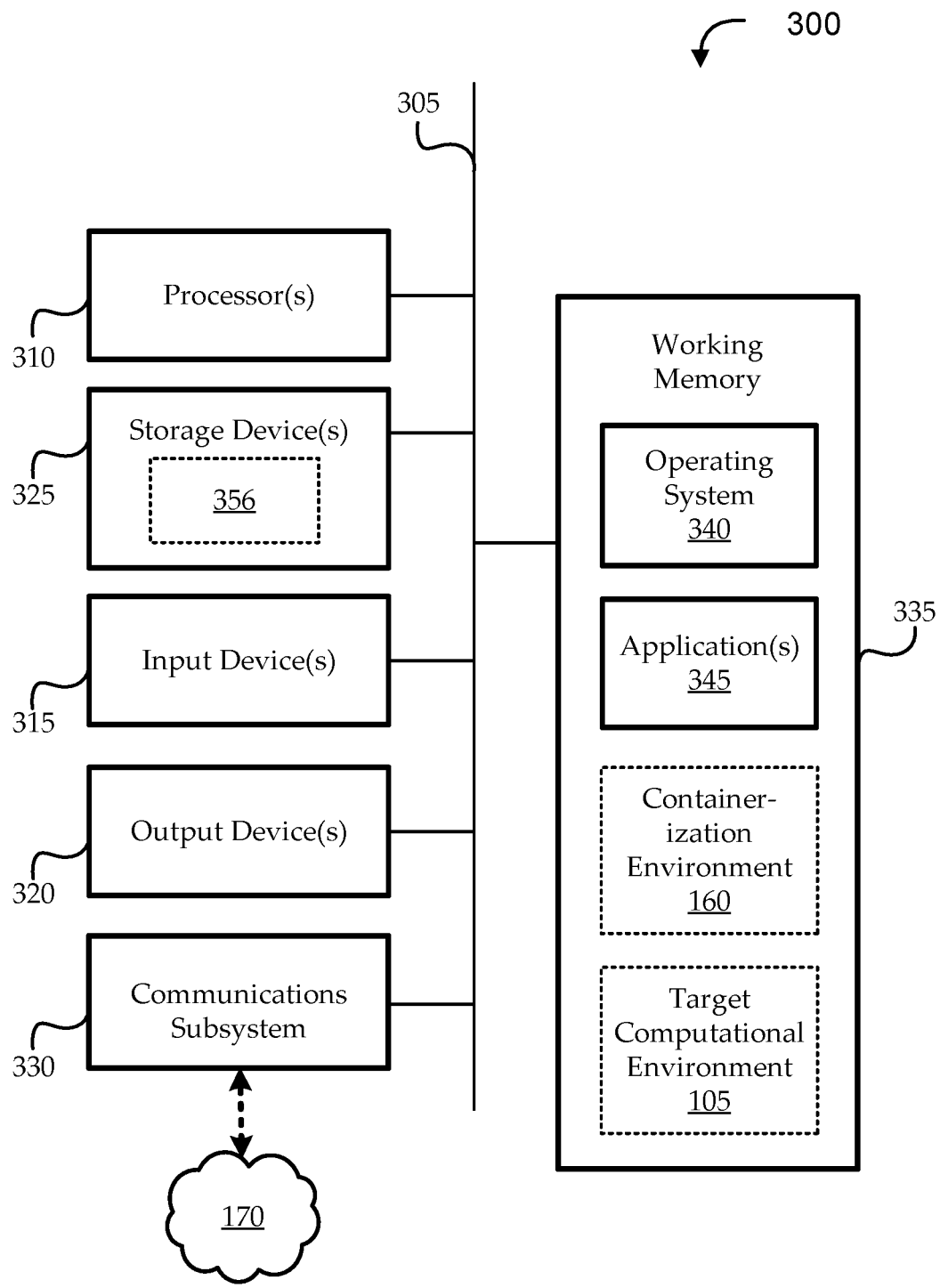
FIG. 3 provides a schematic illustration of one embodiment of a computer system that can implement various system components and/or perform various steps of methods provided by various embodiments.

Embodiments of the containerization environment 160 and/or the target computational environment 105, or components thereof, can be implemented on, and/or can incorporate, one or more computer systems, as illustrated in FIG. 3. FIG. 3 provides a schematic illustration of one embodiment of a computer system 300 that can implement various system components and/or perform various steps of methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, and/or the like; and one or more output devices 320, which can include, without limitation, a display device, a printer, and/or the like. In some implementations, the computer system 300 is a server computer configured to interface with additional computers (not with human users), such that the input devices 315 and/or output devices 320 include various physical and/or logical interfaces (e.g., ports, etc.) to facilitate computer-to-computer interaction and control.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 325 include the data store 356. For example, resource maps, OS-specific resource interactions, and/or other relevant information can be stored by the storage devices 325.

The computer system 300 can also include a communications subsystem 330, which can include, without limitation, a modem, a network card (wireless or wired), an infrared communication device, a wireless communication device, and/or a chipset (such as a Bluetooth™ device, an 302.11 device, a WiFi device, a WiMax device, cellular communication device, etc.), and/or the like. As described herein, the communications subsystem 330 supports multiple communication technologies. Further, as described herein, the communications subsystem 330 can provide communications with one or more communication networks 170. For example, embodiments can be an implementation of a server 104 that uses the communications subsystem 330 to communicate with one or more target devices 102 via the communication networks 170; or embodiments can be an implementation of a target device 102 that uses the communications subsystem 330 to communicate with one or more servers 104 via the communication networks 170.

In many embodiments, the computer system 300 will further include a working memory 335, which can include a RAM or ROM device, as described herein. The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 340 is (or includes) the containerization OS 165, and the working memory 335 is used in conjunction with the one or more processors 310 to implement some or all of the containerization environment 160. In other embodiments, the operating system 340 is (or includes) the target OS 110, and the working memory 335 is used in conjunction with the one or more processors 310 to implement some or all of the target computational environment 105.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
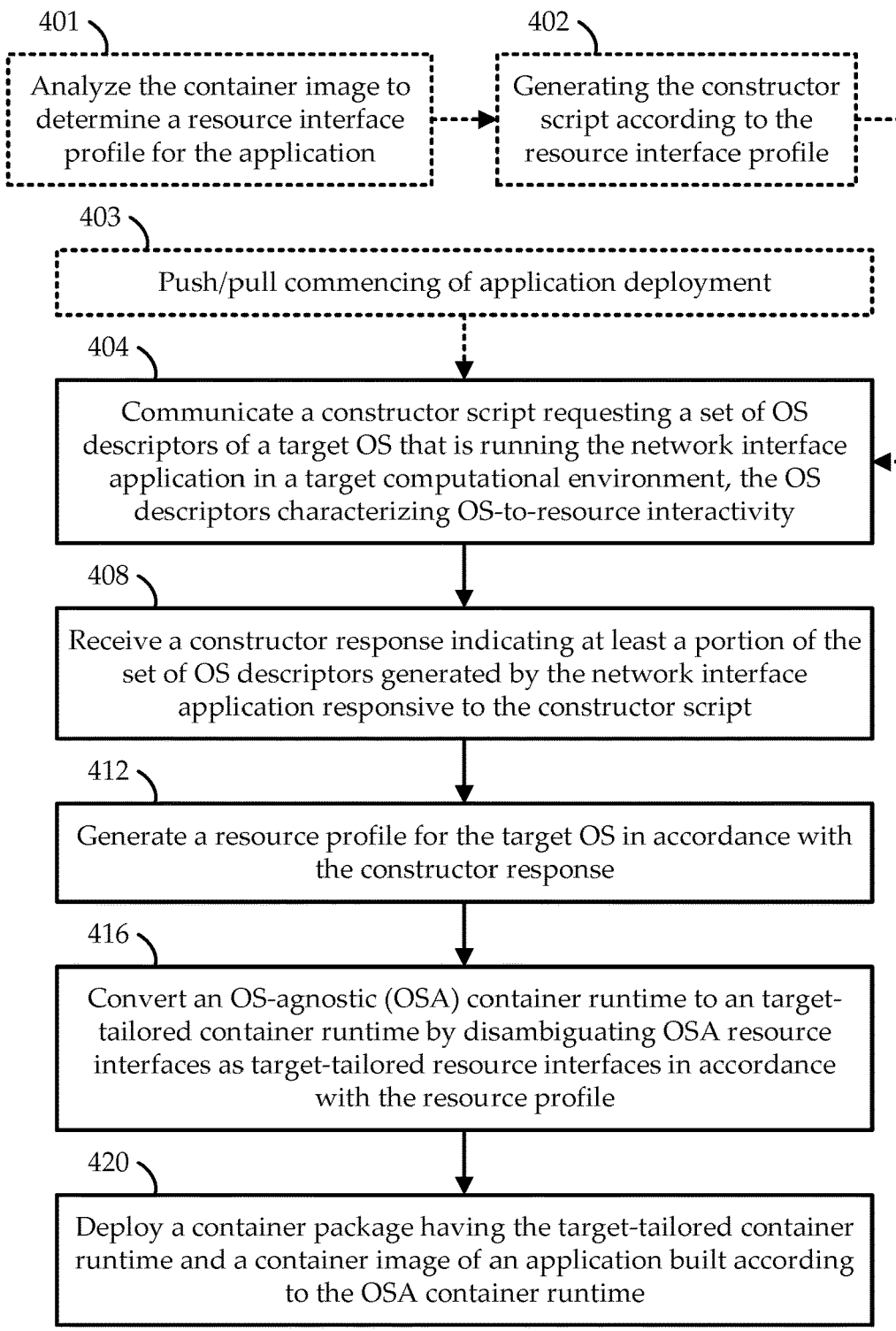
FIG. 4 shows a flow diagram of an illustrative method for OS-agnostic containerization, according to various embodiments.

Systems including those described above can be used to implement various methods. FIG. 4 shows a flow diagram of an illustrative method 400 for OS-agnostic containerization, according to various embodiments. Embodiments of the method 400 begin at stage 404 by communicating a constructor script from a containerization environment to a network interface application. The constructor script requests a set of OS descriptors of a target OS that is running the network interface application in a target computational environment. The OS descriptors characterize OS-to-resource interactivity. In some embodiments, the construction script is a standard script generated for use in all cases. In other embodiments, the construction script is partially standard and partially tailored to specifics of the case (e.g., resource needs of the application being deployed). In some embodiments, the construction script is generated prior to the communicating at stage 404. For example, at stage 401, embodiments can analyze the container image (e.g., application code, manifest, binaries, libraries, etc.) to determine a resource interface profile for the application. At stage 402, such embodiments can generate the constructor script according to the resource interface profile.

Some embodiments begin prior to stage 404 (at stage 403), by receiving a pull or push command to commence deployment of the application. Some such embodiments receive a pull communication at stage 403 requesting deployment of the application, and the communicating at stage 404 is responsive to the pull communication. For example, the pull communication is received by the containerization environment from the target computational environment. Other such embodiments receive a push communication at stage 403 requesting deployment of the application, and the communicating at stage 404 is responsive to the push communication. For example, the push communication is received the containerization environment from a server on which the containerization environment is implemented, and/or any other computational environment other than the target computational environment.

At stage 408, embodiments can receive (e.g., by the containerization environment from the network interface application) a constructor response indicating at least a portion of the set of OS descriptors generated by the network interface application responsive to the constructor script. In some embodiments, the communicating at stage 404 directs prompting of a user, by the network interface application via a user interface of the target computational environment, to commence deployment of the application to the target computational environment. In such embodiments, the constructor response can be generated at least partially in response to the user interacting with the prompt. As described herein, the set of OS descriptors requested by the constructor script and generated by the constructor response can relate to any suitable OS-to-resource interactions, including relating to at least one of a network stack implemented by the target OS, a process identification number used by the target OS, an inter-process communication resource used by the target OS, a mounting system implemented by the target OS, a local memory accessed by the target OS, and/or a central processing unit accessed by the local OS.

As described herein, some embodiments implement the containerization environment on a server computational environment and implement the target computational environment on a user computational device in communication with the server computational environment via a communication network. In such embodiments, the communicating at stage 404 can be from the server computational environment to the user computational device via the communication network, and the receiving at stage 408 can be by the server computational environment from the user computational device via the communication network. In other embodiments, the containerization environment is implemented local to the target computational environment.

At stage 412, embodiments can generate a resource profile for the target OS (e.g., by the containerization environment) in accordance with the constructor response. At stage 416, embodiments can convert (e.g., by the containerization environment) an OS-agnostic (OSA) container runtime to a target-tailored container runtime by disambiguating OSA resource interfaces as target-tailored resource interfaces in accordance with the resource profile. Some embodiments determine a matching OS profile from multiple stored OS profiles as having a respective OS-to-resource interactivity that is most similar to that characterized by the resource profile. Such embodiments can disambiguate the OSA resource interfaces as the target-tailored resource interfaces using the matching OS profile. In other embodiments, the converting at stage 416 includes applying the resource profile to a deep reinforcement learning engine to disambiguate the OSA resource interfaces as the target-tailored resource interfaces. At stage 420, embodiments can deploy (e.g., by the containerization environment to the target computational environment) a container package having the target-tailored container runtime and a container image of an application built according to the OSA container runtime.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for operating system (OS) agnostic containerization comprising:
    communicating a constructor script from a containerization environment to a network interface application (NIFA) running on a target OS in a target computational environment, the constructor script causing the NIFA to generate a prompt that causes a user to perform a predictable interaction, the constructor script to detect a manner of OS-to-resource interactivity by monitoring a manner in which resources of the target computational environment are used by the NIFA to implement the predictable interaction, the OS-to-resource interactivity defined by the target OS;
    receiving, by the containerization environment from the NIFA, a constructor response describing the manner of the OS-to-resource interactivity detected responsive to the constructor script;
    generating a resource profile for the target OS by the containerization environment in accordance with the constructor response, the resource profile indicating that the target OS has access to at least the resources of the target computational environment used by the NIFA to implement the predictable interaction;
    converting, by the containerization environment, an OS-agnostic (OSA) container runtime to a target-tailored container runtime by disambiguating OSA resource interfaces as target-tailored resource interfaces in accordance with the resource profile; and
    deploying, by the containerization environment to the target computational environment, a container package having the target-tailored container runtime and a container image of an application built according to the OSA container runtime.

2. The method of claim 1, further comprising:
    analyzing the container image to determine a resource interface profile for the application; and
    generating the constructor script according to the resource interface profile.

3. The method of claim 1, further comprising:
    receiving a pull communication, by the containerization environment from the target computational environment, requesting deployment of the application,
    wherein the communicating is responsive to the pull communication.

4. The method of claim 1, further comprising:
    receiving a push communication, by the containerization environment from a computational environment other than the target computational environment, requesting deployment of the application,
    wherein the communicating is responsive to the push communication.

5. The method of claim 1, wherein:
    the containerization environment is implemented on a server computational environment;
    the target computational environment is implemented on a user computational device in communication with the server computational environment via a communication network;
    communicating the constructor script is from the server computational environment to the user computational device via the communication network; and
    receiving the constructor response is by the server computational environment from the user computational device via the communication network.

6. The method of claim 1, wherein the containerization environment is implemented local to the target computational environment.

7. The method of claim 1, wherein the converting comprises:
    determining a matching OS profile from a plurality of stored OS profiles as having a respective OS-to-resource interactivity that is most similar to that characterized by the resource profile; and
    disambiguating the OSA resource interfaces as the target-tailored resource interfaces in using the matching OS profile.

8. The method of claim 1, wherein the converting comprises applying the resource profile to a deep reinforcement learning engine to disambiguate the OSA resource interfaces as the target-tailored resource interfaces.

9. The method of claim 1, wherein:
    communicating the constructor script comprises directing prompting of a user, by the network interface application via a user interface of the target computational environment, to commence deployment of the application to the target computational environment; and
    the constructor response is generated at least partially in response to the user interacting with the prompt.

10. The method of claim 1, wherein the constructor response describes the manner of the OS-to-resource interactivity relating to at least one of: a network stack implemented by the target OS, a process identification number used by the target OS, an inter-process communication resource used by the target OS, a mounting system implemented by the target OS, a local memory accessed by the target OS, or a central processing unit accessed by the local OS.

11. A system for operating system (OS) agnostic containerization comprising:
    one or more processors; and
    a processor-readable memory having instructions stored thereon, which, when executed, cause the one or more processors to perform steps comprising:
        communicating a constructor script to a network interface application (NIFA) running on a target OS in a target computational environment, the constructor script causing the NIFA to generate a prompt that causes a user to perform a predictable interaction, the constructor script to detect a manner of OS-to-resource interactivity by monitoring a manner in which resources of the target computational environment are used by the NIFA to implement the predictable interaction, the OS-to-resource interactivity defined by the target OS;

receiving, from the NIFA, a constructor response describing the manner of the OS-to-resource interactivity detected responsive to the constructor script;

generating a resource profile for the target OS by the containerization environment in accordance with the constructor response, the resource profile indicating that the target OS has access to at least the resources of the target computational environment used by the NIFA to implement the predictable interaction;

converting, by the containerization environment, an OS-agnostic (OSA) container runtime to a target-tailored container runtime by disambiguating OSA resource interfaces as target-tailored resource interfaces in accordance with the resource profile; and deploying, by the containerization environment to the target computational environment, a container package having the target-tailored container runtime and a container image of an application built according to the OSA container runtime.

12. The system of claim 11, wherein the instructions, when executed, cause the one or more processors to perform steps further comprising:

analyzing the container image to determine a resource interface profile for the application; and generating the constructor script according to the resource interface profile.

13. The system of claim 11, wherein the communicating the constructor script is performed responsive to receiving one of a pull communication or a push communication requesting deployment of the application.

14. The system of claim 11, wherein the converting comprises:

determining a matching OS profile from a plurality of stored OS profiles as having a respective OS-to-resource interactivity that is most similar to that characterized by the resource profile; and disambiguating the OSA resource interfaces as the target-tailored resource interfaces in using the matching OS profile.

15. The system of claim 11, wherein the converting comprises applying the resource profile to a deep reinforcement learning engine to disambiguate the OSA resource interfaces as the target-tailored resource interfaces.

16. The system of claim 11, wherein:

communicating the constructor script comprises directing prompting of a user, by the network interface application via a user interface of the target computational environment, to commence deployment of the application to the target computational environment; and the constructor response is generated at least partially in response to the user interacting with the prompt.

17. A system for operating system (OS) agnostic containerization comprising:

a resource profiler implemented by a containerization environment of a server computer system configured to generate a resource profile of a target OS of a target computational environment in communication with the containerization environment via a communication network by:

communicating a constructor script to a network interface application (NIFA), the constructor script causing the NIFA to generate a prompt that causes a user to perform a predictable interaction, the constructor script to detect a manner of OS-to-resource interactivity by monitoring a manner in which resources of the target computational environment are used by the NIFA to implement the predictable interaction, the OS-to-resource interactivity defined by the target OS;

receiving, from the NIFA, a constructor response describing the manner of the OS-to-resource interactivity detected responsive to the constructor script; and generating a resource profile for the target OS by the containerization environment in accordance with the constructor response, the resource profile indicating that the target OS has access to at least the resources of the target computational environment used by the NIFA to implement the predictable interaction; and a runtime generator implemented by the containerization environment, coupled with the resource profiler, and configured to convert an OS-agnostic (OSA) container runtime to a target-tailored container runtime for deployment to the target computational environment to be run on the target OS by disambiguating OSA resource interfaces as target-tailored resource interfaces in accordance with the resource profile.

18. The system of claim 17, further comprising:

a data store having, stored thereon, a plurality of stored OS profiles, each having a respective OS-to-resource interactivity, wherein the runtime generator is configured to convert the OSA container runtime to the target-tailored container runtime by:

determining a matching OS profile from the plurality of stored OS profiles as having the respective OS-to-resource interactivity that is most similar to that characterized by the resource profile; and disambiguating the OSA resource interfaces as the target-tailored resource interfaces in using the matching OS profile.

19. The system of claim 17, wherein:

the runtime generator comprises a machine learning engine; and the runtime generator is configured to convert the OSA container runtime to the target-tailored container runtime by applying the resource profile to the machine learning engine to disambiguate the OSA resource interfaces as the target-tailored resource interfaces.

* * * * *